(12) United States Patent
Wilkinson et al.

(10) Patent No.: US 11,144,905 B1
(45) Date of Patent: Oct. 12, 2021

(54) PAYMENT PROCESSING USING ELECTRONIC BENEFIT TRANSFER (EBT) SYSTEM

(71) Applicant: ModoPayments, LLC, Richardson, TX (US)

(72) Inventors: Aaron Wilkinson, Albany, OR (US); Gregory W. Harvey, McKinney, TX (US); Bruce Parker, Richardson, TX (US); Michael Menefee, Richardson, TX (US)

(73) Assignee: ModoPayments, LLC, Richardson, TX (US)

( * ) Notice: Subject to any disclaimer, the term of this patent is extended or adjusted under 35 U.S.C. 154(b) by 150 days.

(21) Appl. No.: 15/386,974

(22) Filed: Dec. 21, 2016

Related U.S. Application Data

(60) Provisional application No. 62/270,279, filed on Dec. 21, 2015.

(51) Int. Cl.
| | |
|---|---|
| *G06Q 20/32* | (2012.01) |
| *G06Q 20/20* | (2012.01) |
| *H04W 8/00* | (2009.01) |
| *G06Q 20/34* | (2012.01) |
| *G06Q 20/40* | (2012.01) |
| *G06Q 20/10* | (2012.01) |
| *G06Q 30/02* | (2012.01) |
| *H04W 4/02* | (2018.01) |

(52) U.S. Cl.
CPC ....... *G06Q 20/3221* (2013.01); *G06Q 20/102* (2013.01); *G06Q 20/202* (2013.01); *G06Q 20/3226* (2013.01); *G06Q 20/351* (2013.01); *G06Q 20/40* (2013.01); *G06Q 30/0207* (2013.01); *H04W 4/02* (2013.01); *H04W 8/005* (2013.01)

(58) Field of Classification Search
CPC .. G06Q 20/3221; G06Q 20/102; G06Q 20/40; G06Q 20/351; G06Q 30/0207; G06Q 20/3226; G06Q 20/202; H04W 8/005; H04W 4/02
See application file for complete search history.

(56) References Cited

U.S. PATENT DOCUMENTS

| | | | |
|---|---|---|---|
| 6,292,786 B1 * | 9/2001 | Deaton | G06Q 20/0457 705/14.25 |
| 8,751,380 B2 * | 6/2014 | Harvey | G06Q 10/00 705/39 |
| 10,115,087 B2 * | 10/2018 | Pourfallah | G06Q 20/10 |

(Continued)

FOREIGN PATENT DOCUMENTS

WO    WO 2008/102935 A1    8/2008

*Primary Examiner* — Nathan A Mitchell
(74) *Attorney, Agent, or Firm* — Frost Brown Todd LLC

(57) ABSTRACT

Systems and methods are described for incorporating electronic benefit transfer (EBT) systems into a secure, mobile, and electronic payment processing system. Existing EBT systems capture data regarding a purchase. This record keeping functionality can be harnessed to provide retailers and marketers with data regarding marketing efforts, coupon use, and more. A mobile device can be used to interact with a presence detection system. Coupons or payment information can be received at a mobile device, and payments can be carried out between a mobile device and a points of sale (POS).

8 Claims, 14 Drawing Sheets

(56) References Cited

U.S. PATENT DOCUMENTS

| | | | |
|---|---|---|---|
| 2009/0281949 A1* | 11/2009 | Coppinger | G06Q 20/02 705/50 |
| 2011/0166992 A1* | 7/2011 | Dessert | G06Q 20/0655 705/39 |
| 2012/0310824 A1* | 12/2012 | Liberty | G06Q 40/02 705/40 |
| 2014/0040001 A1* | 2/2014 | Harvey | G06Q 10/00 705/14.26 |
| 2014/0089169 A1* | 3/2014 | Kapur | G06Q 20/105 705/39 |
| 2014/0114780 A1 | 4/2014 | Menefee et al. | |
| 2014/0258009 A1* | 9/2014 | Alshobaki | G06Q 20/4012 705/18 |
| 2014/0258123 A1* | 9/2014 | Fernandes | G06Q 40/025 705/44 |
| 2014/0279474 A1* | 9/2014 | Evans | G06Q 20/3572 705/41 |
| 2015/0134470 A1* | 5/2015 | Hejl | G07G 1/0045 705/21 |
| 2015/0347991 A1* | 12/2015 | Unser | G06Q 20/10 705/39 |
| 2016/0055583 A1* | 2/2016 | Liberty | G06Q 40/04 705/37 |

* cited by examiner

PAYMENT PROCESSING USING ELECTRONIC BENEFIT TRANSFER (EBT) SYSTEM

CROSS REFERENCE TO RELATED INFORMATION

This application claims the benefit of U.S. Provisional Patent Application No. 62/270,279, filed Dec. 21, 2015, titled, "Payment Processing Using Electronic Benefit Transfer (EBT) System", the contents of which are hereby incorporated herein in its entirety.

TECHNICAL FIELD

The present disclosure is directed to electronic payment processing and offer systems, and more specifically to making and redeeming offers in a secure, mobile electronic payment processing system.

BACKGROUND OF THE INVENTION

A common problem in commerce and advertising is that sending bulk ads/offers is cheap but of limited effectiveness and the seller/manufacturer usually cannot interact with the consumer or customer. On the other hand, if a store hires numerous sales people, a high level of interaction can be achieved with consumers, but such practices are expensive. Retailers would love to know various indicators of consumer behavior: whether consumers buy certain products on a regular basis, how often, what quantities, in combination with what other products, at what stores, what coupons work, etc. The more data a retailer has, the more it can target its marketing or advertising efforts toward methods that show the greatest return on investment. Retailers have a need for tools for marketing and selling that provide high levels of interaction with customers while at the same time being inexpensive. This can also help direct ads toward customers that actually want to see them.

BRIEF SUMMARY OF THE INVENTION

One possible embodiment of the present disclosure comprises a system for allowing a consumer to complete a payment transaction with a merchant at a merchant location, the system comprising: a detection unit operable to detect a mobile device associated with the consumer; a remote server in communication with the detection unit, the remote server used to verify an identity of the consumer using the mobile device and to form a virtual payment account number, wherein the virtual payment account number is associated with a coin, the coin acting as an identifier for a transaction between the merchant and consumer and is specific to the payment transaction, the remote server further operable to send payment authorization information to the consumer's mobile device to allow the consumer to initiate a payment transaction with the merchant; and an EBT point of sale terminal used to process the payment transaction at the request of the consumer, processing the payment transaction using the authorization information, wherein the authorization information is associated with the virtual payment account number and the virtual payment account number is used by the merchant as a mechanism for payment using an EBT payment processing system for the purpose of identifying each item purchased by the consumer.

Another possible embodiment of the present disclosure comprises a system for allowing a consumer to complete a payment transaction with a merchant at a merchant location, the system comprising: a detection unit operable to detect a mobile device associated with the consumer; a remote server in communication with the detection unit, the remote server used to verify an identity of the consumer using the mobile device and to form a virtual payment account number, the remote server further operable to send the virtual payment account number to the mobile device; and an EBT point of sale terminal used to process the payment transaction at the request of the consumer; wherein the system processes the payment transaction using the virtual payment account number as a mechanism for payment using an EBT payment processing system for the purpose of identifying each item purchased by the consumer.

Another possible embodiment of the present disclosure comprises a method of allowing a consumer to complete a payment transaction with a merchant at a merchant location, the method comprising: receiving a notification that a mobile device associated with the consumer is at a location; verifying an identity of the consumer using the mobile device; forming a virtual payment account number, wherein the virtual payment account number is associated with a coin, the coin acting as an identifier for a transaction between the merchant and consumer and is specific to the payment transaction; and sending payment authorization information to the consumer's mobile device to allow the consumer to initiate a payment transaction with the merchant; wherein a point of sale terminal is used to process the payment transaction using the authorization information at the request of the consumer, wherein the authorization information is associated with the virtual payment account number and the virtual payment account number is used by the merchant as a mechanism for payment using an EBT payment processing system for the purpose of identifying each item purchased by the consumer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
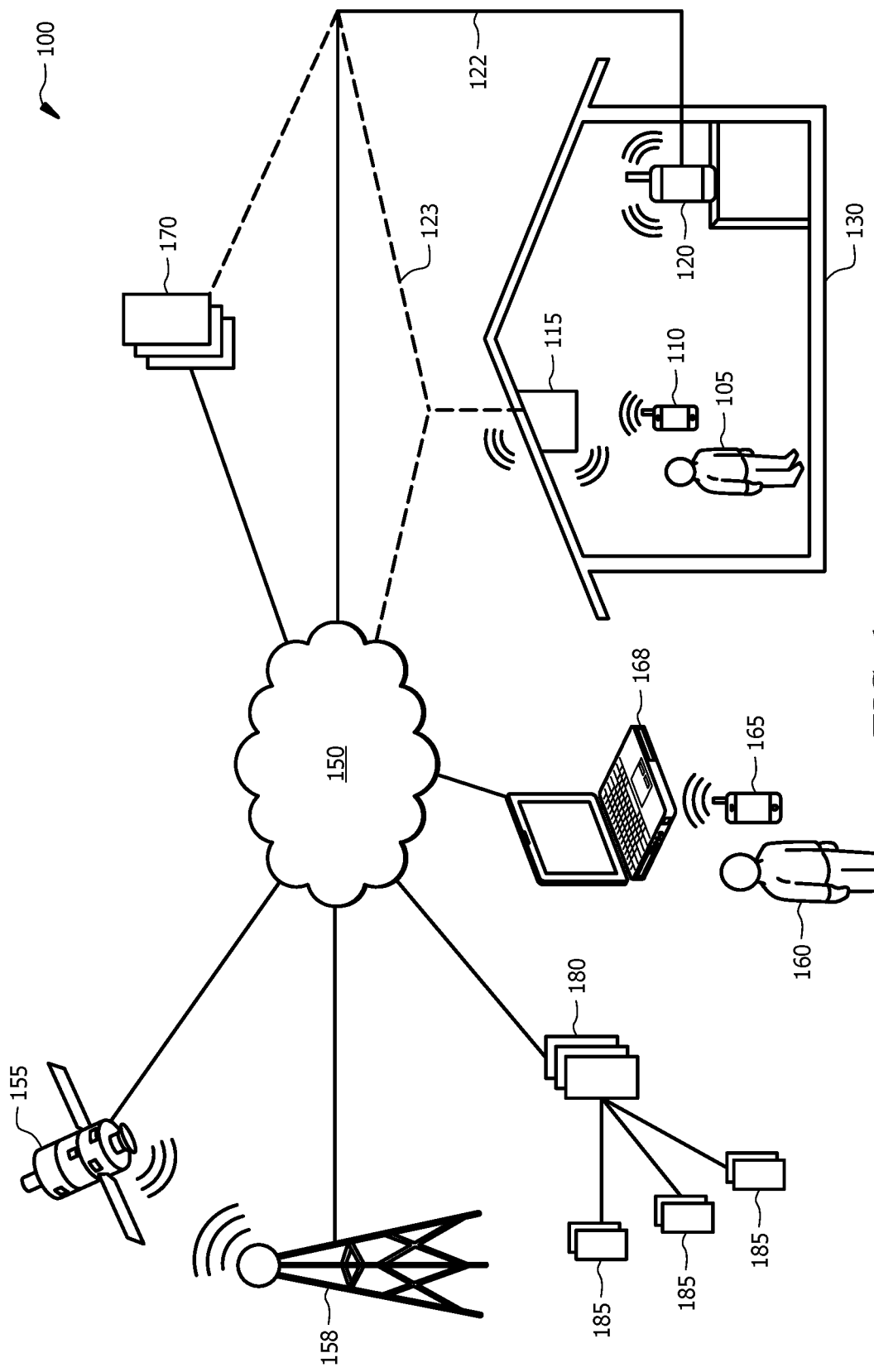
FIG. 1 is a diagram of a possible embodiment under the present disclosure.

When consumers present a payment card at a retailer's point-of-sale (POS) terminal, they are generally asked what type of card is being presented, for example, a credit card, debit card, gift card, etc. The type of card determines the payment processing network used by the POS terminal or retailer network that is used to process the payment. Each type of card uses a different payment network and process. One type of payment network that is available, particularly at grocery stores and drug stores, is an electronic benefit transfer (EBT) system. These systems can be associated with benefits that are distributed through the Supplemental Nutrition Assistance Program (SNAP), formerly the Food Stamp Program or Temporary Assistance for Needy Families (TANF). Since these programs have restrictions on what can be bought with the benefits, any payment using an EBT card has to be examined in real time at the time of purchase to ensure that only approved items are paid for using the benefits. To make this determination, the EBT payment process includes both the payment information and information on all of the items being purchased. This information is sent to an EBT processor which approves or denies each item based on the program rules. While EBT transactions are currently only associated with benefit programs, embodiments under the present disclosure use the EBT payment process to capture a customer's shopping cart or purchase receipt information, identifying all of the items purchased by the consumer during that transaction. This information may be captured by retailers using reward programs and the like.

The present teachings provide a payment and marketing system allowing consumers to access a variety of payment options via a mobile device, and for retailers and companies to interact directly with consumers. The present teachings may make use of virtual payment account numbers (VPANs) and related payment technology, such as set forth in United States Patent Application Publication Nos. 2014/0114780, 2012/0101887, and 2014/0040001, which are incorporated herein by reference.

The present teachings allow various entities to interact with the consumer and bring the consumer value. For example, a manufacturer can engage consumers, by sending coupons or offers that can be redeemed at a variety of retailers. Other financial entities may be able to offer coupons or other deals to consumers as well. For example a credit card company may desire to promote some product or store. The financial payment processing entity can interact with both consumers, retailers, and other financial entities such as credit cards, as the financial payment processing entity interacts and interfaces with all these groups. Furthermore, marketing entities may be able to analyze data regarding consumer behavior. Marketing entities can be marketing divisions of the entities listed above, or they may be contracted marketing companies that are contracted to analyze the data collected. Each involved party must have contractual permission to access data that they receive. A customer may have to consent to data collection in the terms and conditions associated with downloading a mobile application. Furthermore, a customer, once the application is installed, will have to associate various payment methods (money sources) with the application/device. Doing so may require further acceptance of terms and conditions. The customer can sell their information for the coupons and other financial incentives that they will receive.

One embodiment of the present teachings is a system and method for providing customers with a variety of payment options, accessed via a mobile device or application, when the customer wishes to pay at a retail location. Whatever payment source or method the customer chooses, a VPAN or other number can be generated to match the type of payment accepted by the retailer. The system can also make use of a coin, described further below.

The system and methods described herein can combine these payment technologies (VPAN and/or payment coins) with the EBT (electronic benefits transfer) card technology. EBT allows a receipt or purchase record to be sent to various contracted parties, allowing greater tracking of customers and allowing study of consumer behavior. For example, some POS (point of sale) devices already work with EBT cards, in most cases POS devices in grocery stores and other establishments. As described, EBT cards are commonly used for government programs wherein recipients can use EBT cards to purchase food or other goods. Oftentimes recipients are prohibited from using EBT cards to purchase certain items, such as alcohol. As such EBT POS units are capable of receiving and sending data regarding purchased items, also referred to as the "shopping cart." The current teachings expand upon the VPAN, coin, and EBT technologies. The EBT functionality of reporting on a shopper's shopping cart can be harnessed to provide retailers or other advertisers access to the shopping cart as a means of studying the effects of various marketing efforts. When combined with the payments systems such as VPAN or coin, an advertiser or retailer can have a view of a customer's behavior from beginning to end, from entering a store or receiving an offer until payment.

FIG. 1 shows a possible system embodiment 100 under the present disclosure. In system 100, a consumer 105 may enter a store or other location 130. A detection device 115 at location 130 can detect consumer 105 by their mobile device 110. Detection device 115 can communicate by wireless or wired communication with application servers 180. Consumer 105 will preferably have previously registered with application servers 180 (such as user 160 using computer 168 or mobile device 165). Consumer 105 will preferably have downloaded and installed a payment application or marketing application on mobile device 110. When detection device 115 detects mobile device 110 the application servers 180 can respond by sending coupons, offers, or other communications to mobile device 110. Alternately, application servers 180 can perform an identity verification with consumer 105 by requesting a password, thumbprint, or other information. Verification may alternatively involve exchanging information with the mobile device. Application servers can send payment information to mobile device 110 for use in paying for a transaction at location 130. Payment information can comprise a virtual payment account number ("VPAN", described further below). Payment information can also comprise a portion of a VPAN, an entire VPAN, information related to a coin (described below), an electronic benefit transfer (EBT) number, an EBT VPAN, or other information. Part of the payment information can be sent to point of sale (POS) terminal 120. Application servers 180 can continue to send coupons, offers, or other information to consumer 105 before, during, or after, the consumer's visit to location 130. Application servers may have access to a variety of funding sources 185. Funding sources 185 may comprise bank accounts, credit cards, EBT accounts, loyalty points, prizes, or other sources. Application servers 180 may allow consumer 105 to select a funding source for purchases made at location 130 or at other locations. When making a purchase, consumer 105 may approach POS terminal 120. Payment can be accomplished by providing a payment code or a portion thereof. POS terminal 120 can receive the payment information and institute a payment operation. A payment operation may include sending payment and purchase information to EBT servers 170. Application servers 180 may also be involved in payment approval or other aspects of a purchase. Credit card approval, debit card approval, may also be involved. EBT servers 170 may provide approval for the purchase or simply record data from the purchase. Data saved by EBT servers can include consumer identification information, purchased items, prices, coupons, discounts, funding sources, date, time, location and more. EBT servers 170 can save such information or send it to application servers 180. Application servers 180 can use such data to perform analytics regarding marketing and advertising or other criteria. Communication among the various components of system 100 can comprise wireless or wired communication. POS terminal 120 and detection device 115 can comprise wired connections 122, 123 to network 150 or directly to EBT servers 170. They can also comprise wireless interfaces for Wi-Fi, cellular, or any appropriate wireless network. Various wireless networks such as cellular 158, satellite 155, or others can be implemented as part of system 100. Mobile devices can comprise smartphones, cellphones, tablets, smartwatches, and other devices capable of wireless communication.

EBT servers 170 can comprise a variety of servers, computers, network connections, and other hardware and software components in an EBT payment processing system. EBT servers 170 can comprise portions of a preexisting EBT system. EBT systems can be useful because of their ability to capture information about a purchase. This functionality can be useful as application servers 180 may be used by a retailer to monitor and analyze sales and marketing data. Instead of, or in addition to, installing brand new hardware and purchase tracking tools, a pre-existing EBT system can be utilized to capture, store, or track data.

Figure 2:
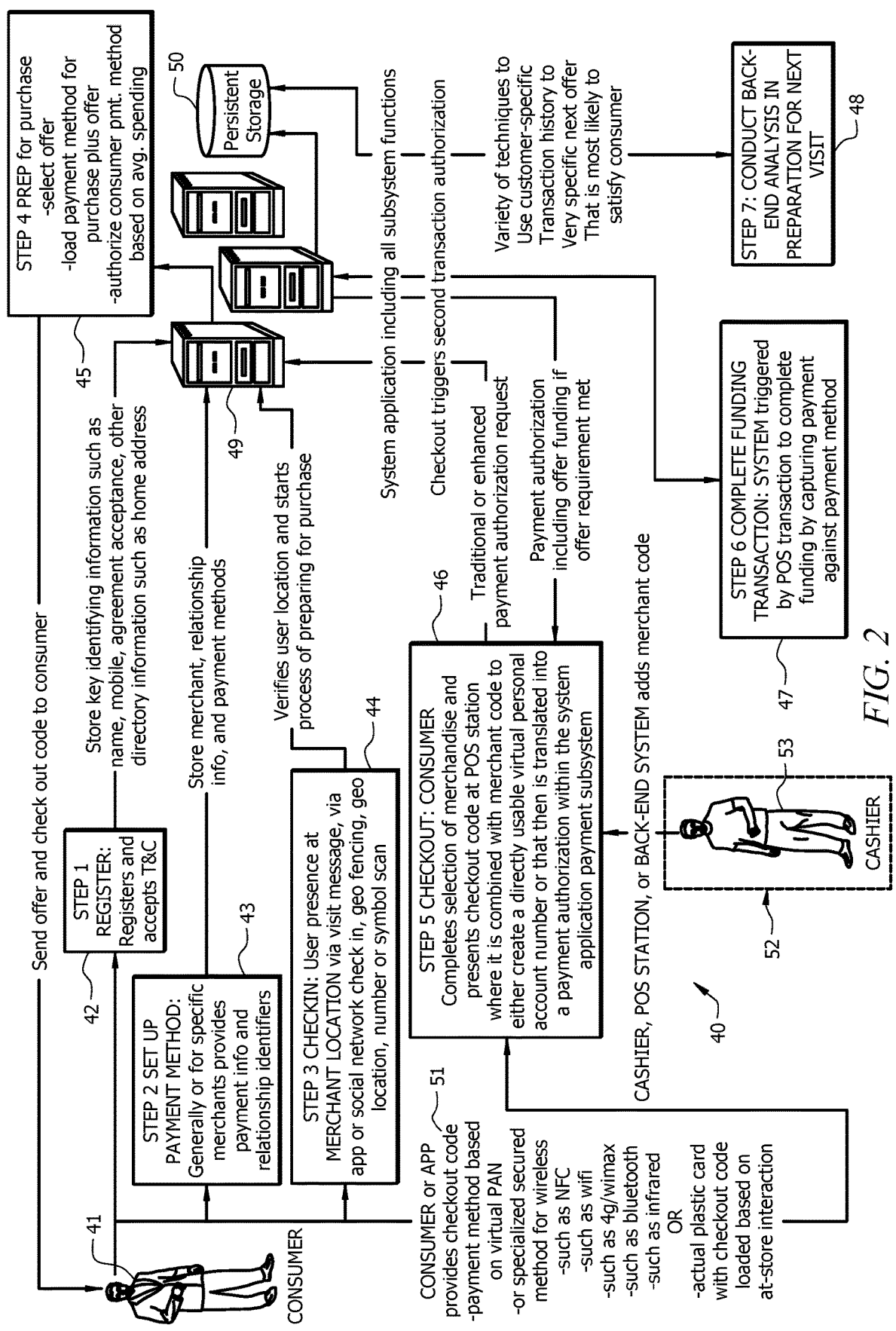
FIG. 2 is a flow-chart diagram of a possible embodiment under the present disclosure.

FIG. 2 shows one embodiment of a payment processing system under the present teachings. As shown, the customer can pull funds from any available money source, and using the systems and methods described can complete the payment using EBT and an EBT compatible POS device. The present teachings include systems and methods for taking advantage of the POS capabilities of EBT systems. As described above, VPANs can be used to convert a customer's desired money source into a one-time use digital card that can pay a merchant in the merchant's desired type of funds. Similarly, the present teachings can take any of a user's money sources and convert it into an EBT style payment that records the purchases made and sends a receipt or report to a retailer, seller, advertiser, etc.

Figure 4:
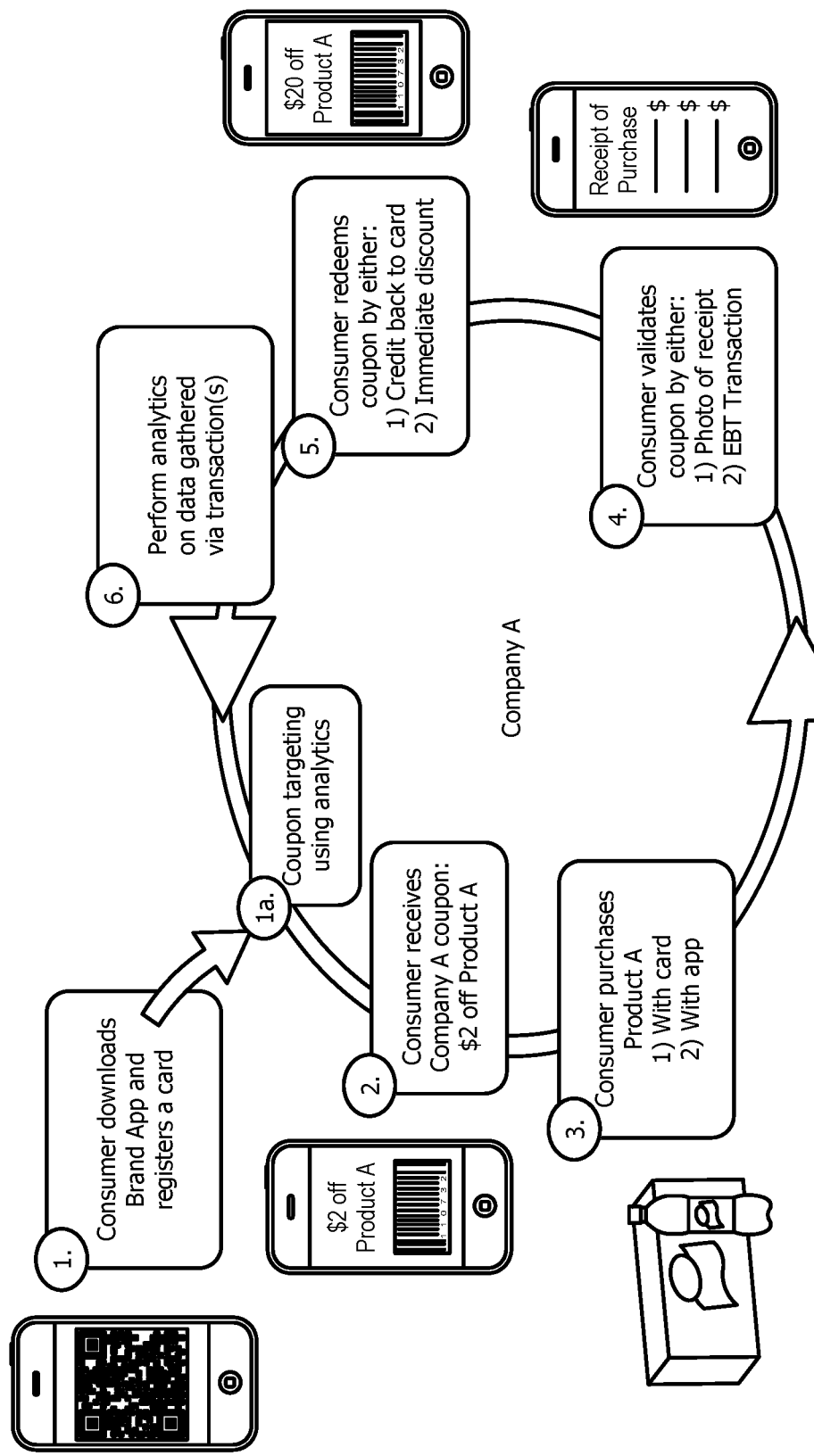
FIG. 4 is a flow-chart diagram of a possible embodiment under the present disclosure.
Figure 5:
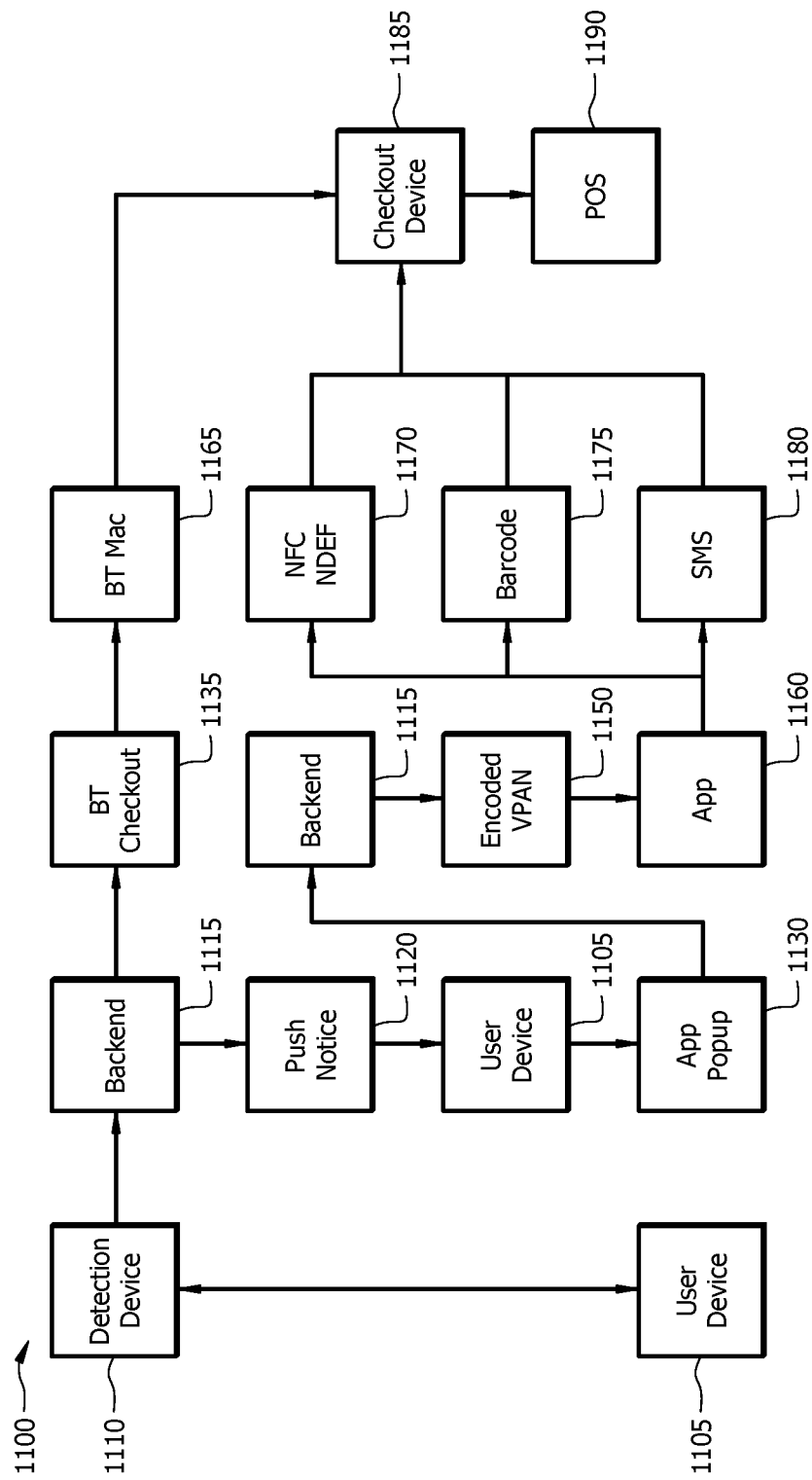
FIG. 5 is a flow-chart diagram of a possible embodiment under the present disclosure.

FIG. 2 displays a possible embodiment whereby a customer could register and pay for merchandise using a VPAN or coin system. At step 1, a customer registers and accepts terms and conditions. At step 2 the payment method is set up. At step 3, a customer's presence is detected at a retail location via any of a variety of methods. At step 4, preparation is made for a purchase, an offer is selected and a payment method is selected. At step 5 the consumer checks out with a cashier at a POS. At step 6 funding is completed for the transaction by capturing the selected payment. At step 7 a back end analysis can be completed, such as recording the purchases and studying consumer preferences or behavior. FIGS. 4 and 5 show further embodiments of the process displayed in FIG. 2.

Using the aggregate data, the retailer, or whatever entity receives the purchase data, will be able to study various aspects of customer data. For example, customers may react differently to shirt coupons than to pants coupons. Or results may vary significantly between 5% or 10% coupons than to 20%—more than would be expected given the different amounts. Women and men may react differently to different coupons. Or women and men may use different money sources with different frequency. Customers may react differently to coupons depending on time of day or day of the week or time of the year.

In various embodiments, a consumer may have several different sources of funds: credit cards, debit cards, gift cards, loyalty cards, reward cards or others. A consumer, at any given time, may have access to all or a subset of these types of funds. Or a consumer may wish to redeem loyalty or rewards points instead of paying cash. Possibly a consumer's credit card carries a high balance, so the consumer wishes to use a second or third credit card. For various reasons, a consumer would like to have access and options to use a variety of fund sources when shopping. However, a retailer may only accept certain types of payments. For example, a store may wish to only accept cash, debit cards, and store-branded charge cards. If a consumer wanted to use a certain credit card, or to use some type of loyalty points, in the past she might not be able to do so. The present teachings allow the consumer to use her payment of choice.

Referring again to FIG. 2, other aspects can be described of the system and method shown. The method 40 preferably begins by registering new consumer(s) 41 before the consumer(s) can enter into transactions using the system, as shown by step 42. The new consumer 41 creates an account and supplies information such as name, address, phone and other identifying information. In addition, at the time of sign up, the consumer 41 can agree to terms and conditions for use of the system and service and register a payment card as shown in step 43 used to fund the consumer portion of transactions. The payment card may be validated by the system and may be checked for availability of funds.

Next, the system 49, which can be connected to persistent storage 50, may require, prior to use, that merchants 52 who desire to use the system also register. The merchant provides their physical address, trade name, and business name, as well as a phone number and other merchant-specific information. The information provided by the merchant can also be verified through other sources such as a Google® search as well as a physical GPS location provided by an independent source. The verification methods would help prevent fraudulent merchant accounts.

The merchant then can create an offer account by which the merchant can fund offers that the system herein presents to consumers and that are fulfilled at their stores resulting in the specific location receiving funds from both the consumer and from the offer account. The offer account can contain the merchant's funds, that are accessible by the service to fulfill transactions. The offer methodology and process will be described in greater detail with respect to FIGS. 1 and 3A-14. In addition to banks or other funding sources or intermediary services such as PayPal® can be used for merchant accounts. The merchant 52 then provides information used by the system to create and load funds onto VPANs. In preferred embodiments, the system knows the average sale amount, the number of transactions per week/month, the frequency of visits, and the gross margin of a typical visit in order to best serve the merchant. The system then sends the merchant 52 the payment prefix(es), or merchant codes(s), which are based on the range of the VPANs used for this merchant for transactions at that merchant and which must be combined with the payment suffix(es), or checkout codes in order to create a complete VPAN that then is presented on the behalf of the consumer for payment authorization. Furthermore, as described below, a VPAN may be associated with a coin. The coin can be used to represent or track all the accounting procedures to be completed in relation to a purchase, such that the coin is balanced after all the accounting steps are completed.

After both the consumer and merchant have registered with the system, the system may then be used to allow the consumer 41 to pay for goods or services or may also be used to present offers to the consumer which may be redeemed through a transaction using the system. As shown in step 44, the consumer checks in or is detected in a participating merchant location. This can be accomplished by any known or future mechanism, such as by having the consumer send a text or SMS message to the system, having the user activate an app on a smart phone that reads a bar code or Quick Response (QR) code at the merchant location, using a geo location or geo fencing feature or a phone or other mobile device that detects the consumer's location, social networking, Bluetooth, wireless, or any other mechanism to alert, detect and/or verify the consumer's location. This location can be set in any number of ways. The service, while not limited thereto, includes embodiments of three ways. The checkout code can be requested for a merchant by the subscriber, for an imminent visit. Alternatively, a checkout code may be automatically sent to a subscriber device once the device is "detected" entering a location. Also, a hybrid of these two approaches is possible, where a subscriber has already entered an establishment and desires repeat business. The person can then request an additional checkout code for a device where context or location awareness is already established. To accommodate transaction inquiries or to facilitate returns/exchanges, the checkout code and mobile phone number may be submitted in the context of the location to retrieve the transaction details.

Once the consumer's 41 presence at the merchant 52 has been determined and where possible verified via geo location services or other means such as cell tower triangulation or GPS location transmission by the system 49, the system then prepares for a potential purchase by the consumer 41, as shown in step 45. The system can, preferably, take a number of actions. The system selects a consumer checkout code to send to the consumer 51 to be used should the consumer 41 make a purchase at the merchant 52. As described, the checkout code, when combined with the merchant code, forms a complete VPAN that can be used to electronically pay for a purchase. As described, in preferred embodiments of the system, the VPAN corresponds to a stored value card number that has been loaded with an amount deemed sufficient to complete a transaction at the merchant. The amount can be a multiple of the average value of a transaction at that merchant, can be set based on the consumer's purchasing history, can be selected by the consumer or merchant or can be set using any other manner consistent with the concepts described herein. Additionally, the value can be transferred to the stored value card at the time of the consumer's check in at the merchant, can be preloaded at some predetermined time, or can be loaded to the card according to some other methodology. If the card is preloaded, the checkout code can be selected based on the amount loaded in that stored value card account. In addition, the consumer's payment account can be authorized for some amount the system determines for the specific location. In other embodiments, an EBT card, number, or account, can be preloaded, temporarily loaded, approved for use, etc.

Also in step 45, the system 49 can determine if there is an offer available for the consumer at that merchant. The offer can come from the merchant, or a related vendor, manufacturer, franchisor, another consumer (gift(s)), etc. any or all of whom are considered offer providers. If an offer or offers are available for the consumer, one or more are selected and presented to the consumer with the checkout code. The offer may have conditions or require that certain triggers be met for the consumer to take advantage of the offer. For example, the consumer may be required to spend a minimum amount or to purchase particular goods or services to receive the benefit of the offer. Any conditions or triggers may be included in the offer while remaining within the scope of the concepts described herein. The system can be used to track whether the conditions or triggers are met using the checkout code, or the merchant modify the point of sale system in order to verify, via automated or manual means, the triggers at the time the transaction is completed at check out. In addition, the offer provider's payment account may be authorized for the specific amount of the offer that the consumer is qualified to receive.

At check out, as shown in step 46, the consumer provides the merchant with the checkout code that was sent to them during check-in which may be a 6 digit suffix/checkout code as described below, and in FIG. 12A-12C. As described, the assigned suffix/checkout code may have the implication of setting a value limit for the transaction since the stored value card account associated with the checkout code may be pre-loaded with a value before check out. The checkout codes are preferably set for a reasonable upper limit of what the consumer is likely to spend at this merchant. The system may include a function for the consumer to request more value (e.g. increase the amount they can spend on this visit), or to request that the system lower their value (perhaps for budget management reasons).

The merchant's cashier 53 enters the prefix/merchant code provided to the merchant by the system, plus the consumer's six digit suffix/checkout code. Expiration date, and any other information required for processing, may be provided to the merchant with the merchant code. The transaction is routed to the preloaded stored value card that was prepared previously, such as at check-in or at the beginning of the business day, and authorized by existing payment processing systems. Settlement will similarly be managed by existing payment processing systems in a known fashion.

In preferred embodiments, a process for combining the merchant code and checkout code includes, in response to a request by the cashier for payment, providing the checkout token to the cashier verbally, in writing, by use of a code on a smart phone app, through wireless communications between a smart phone and or by any other means. The cashier then combines the consumer checkout code with the merchant code and enters it as a "card number" in the register or on the card "swipe" terminal or via other means. The actual entry of the number can be manual or can be through plug in application at the card terminal or merchant register. This results in the register/terminal processing as if a physical card had been presented (though without the card-swipe), or through the actual swipe of a card that has been programmed with the VPAN.

The system 49 receives a notification (advice) that an authorization (which includes capture/completion) has been released for a given card number, and amount. The system 49 will then send a receipt to the consumer for that amount. The system of the present invention, or the merchant, can then compare the amount of the transaction to any applicable offers that were associated with this checkout code. If an offer associated with the checkout code was activated and the conditions for the offer are fulfilled, then the amount of the offer is preferably requested from the merchant's offer account or alternatively another funding account for which the offer provider is responsible. Additionally, the amount of the offer funds requested from the merchant's account (or other funding account) may be grossed up by an amount representing a fee for use of the system.

The system then performs a capture transaction for the total amount minus the offer amount and deducts that amount from the stored value card account based on the authorization performed earlier, as shown in step 47. After the value has been deducted from the stored value card account using the VPAN formed by the checkout code and the merchant code, the consumer's payment card account, loyalty account, reward account, or any other funding source is charged for the total sale minus the offer, which is charged against the offer provider's account.

After the transaction and funding are complete, method 40 moves to step 48 where post transaction analysis is conducted. The system will allow the merchant 52 to manage their offers account based on the amount of funding they provide for offers and the responses that they get. Merchants can use information collected about the purchase and the response to offers to create offers based on the responsiveness of consumers to prior offers. When the merchant decides to make additional offers, the merchant simply adds the value corresponding to the offer to the merchant funding account. Similarly, other offer providers may access transaction analysis data in order to provide additional offer funding.

The payment process using the VPAN according to the present method follows a typical payment card scenario with respect to the stored value card account that was selected for this transaction, except for potential variations attributable to the use of the system. For example, any customer service interaction from a chargeback exception dispute or fraud perspective initiates with the present system instead of either the issuer of the VPAN (if different than the present system), or with the consumer's payment card issuer. Also, the system, in addition to or instead of the merchant, will create a proof of authorization that is retained as evidence of the transaction including location, mobile device, payment transaction details, and purchase receipt data.

In preferred embodiments of the system described herein, a checkout code can be intended to be a single use account number active only for the merchant visit to which it is associated. The checkout code provides credentials for access to the system for a payments authorization, and serves as a longer term reference number for a transaction by a consumer, specific to a particular location. A checkout code may be used to lookup a transaction after it has been completed, given the checkout code and some other details such as the timeframe in which the transaction occurred, the location, or the registered mobile phone number associated with the transaction.

In addition to the checkout code being specific for a given consumer at a given location, the checkout code can also be programmed to be active only for a certain period of time while the consumer is in the merchant location. Generally, this will be on the order of the third or fourth deviation from the average visit length to the merchant, but can be set to any value desired by the system, merchant and/or offer provider. For example, if a coffee shop has a mean visit time of 15 min, but a standard deviation of 3 minutes, the checkout code should be active for at least 25 min.

In certain embodiments, once a checkout code has been activated, or used, it may not be re-used for a substantial period of time. Generally, the period of time between re-use of a particular checkout code should be on the order of a time frame measured in years, with a time frame of at least seven years being preferable. With respect to the actual number generated as the checkout code, the generation of the checkout code itself should not be "anticipatable", and therefore should not be susceptible to fraudulent use via guessing or other means of providing an otherwise valid VPAN at the specific merchant location.

For the service to permit subscribers to complete transactions using the system described herein, individual transactions should preferably be uniquely identified. Once consumers register with the service and record payment method information within the secure environment of the service platform, they will be able to complete a transaction with a traditional retailer according to a unique identifier represented by the checkout code, the merchant code and transaction date and time.

As described, a preferred mechanism to secure these transactions would be a confirmation number. In combination with the merchant code and possibly the date and time of the transaction, the checkout code would uniquely identify a visit by a consumer to a merchant at a specific date and time. Once the transaction is completed and processed, a subscriber will also be able to recall past transaction details via their mobile device or internet connection using an app or web browser.

Several data security enhancements may be used to ensure valid use and re-use of the checkout code, once it is generated. For example, the checkout code will have a time-to-live, or valid time frame in which to use it. Alternatively, the checkout code will not be stored on the service platform in its native form, to prevent unauthorized use and to enhance physical security of the database. Yet another alternative prevents a checkout code from being re-used for the same merchant, using any other device, for a given time period.

Figure 3A:
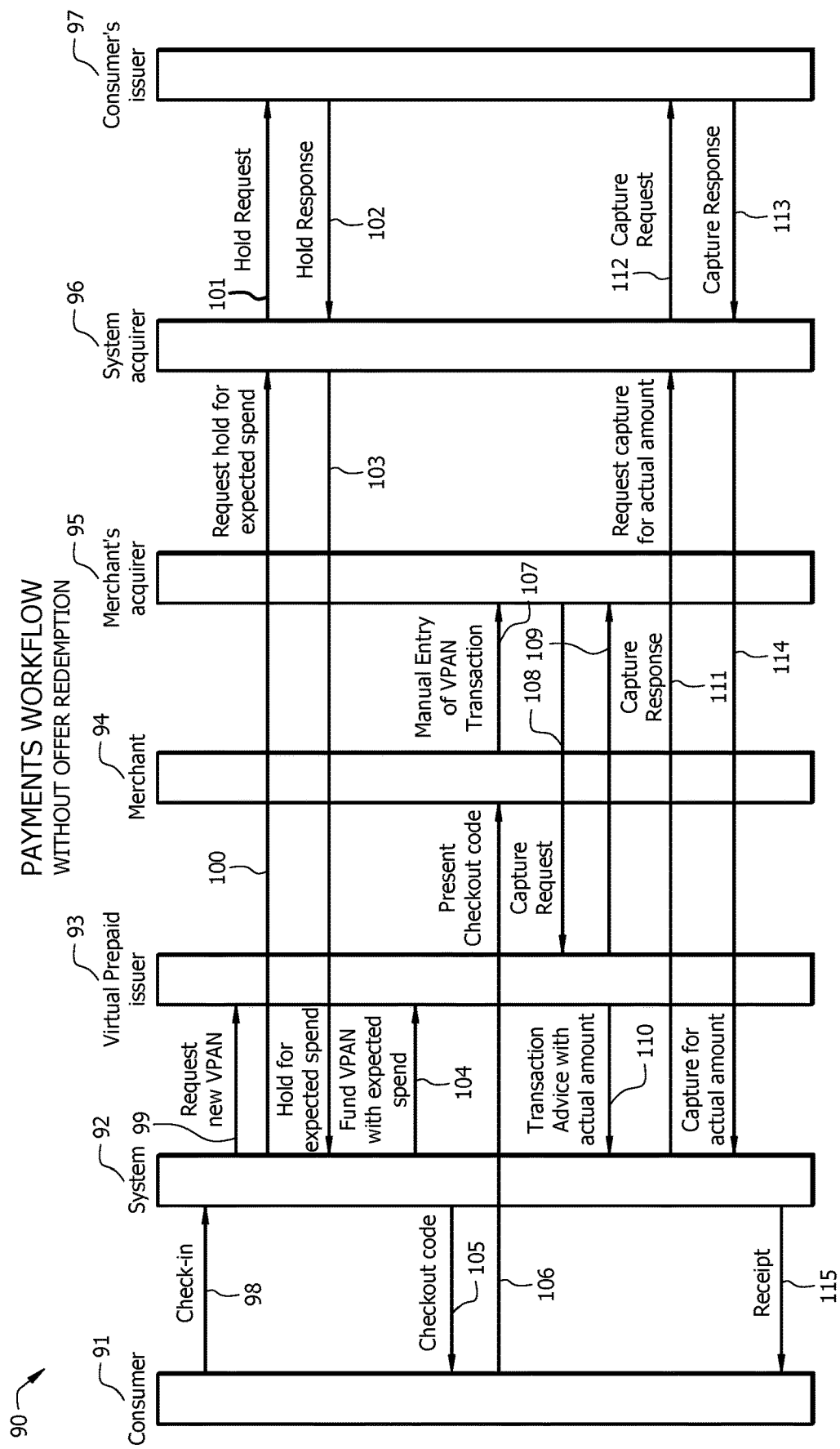
FIGS. 3A-3B are flow-chart diagrams of possible embodiments under the present disclosure.
Figure 3B:
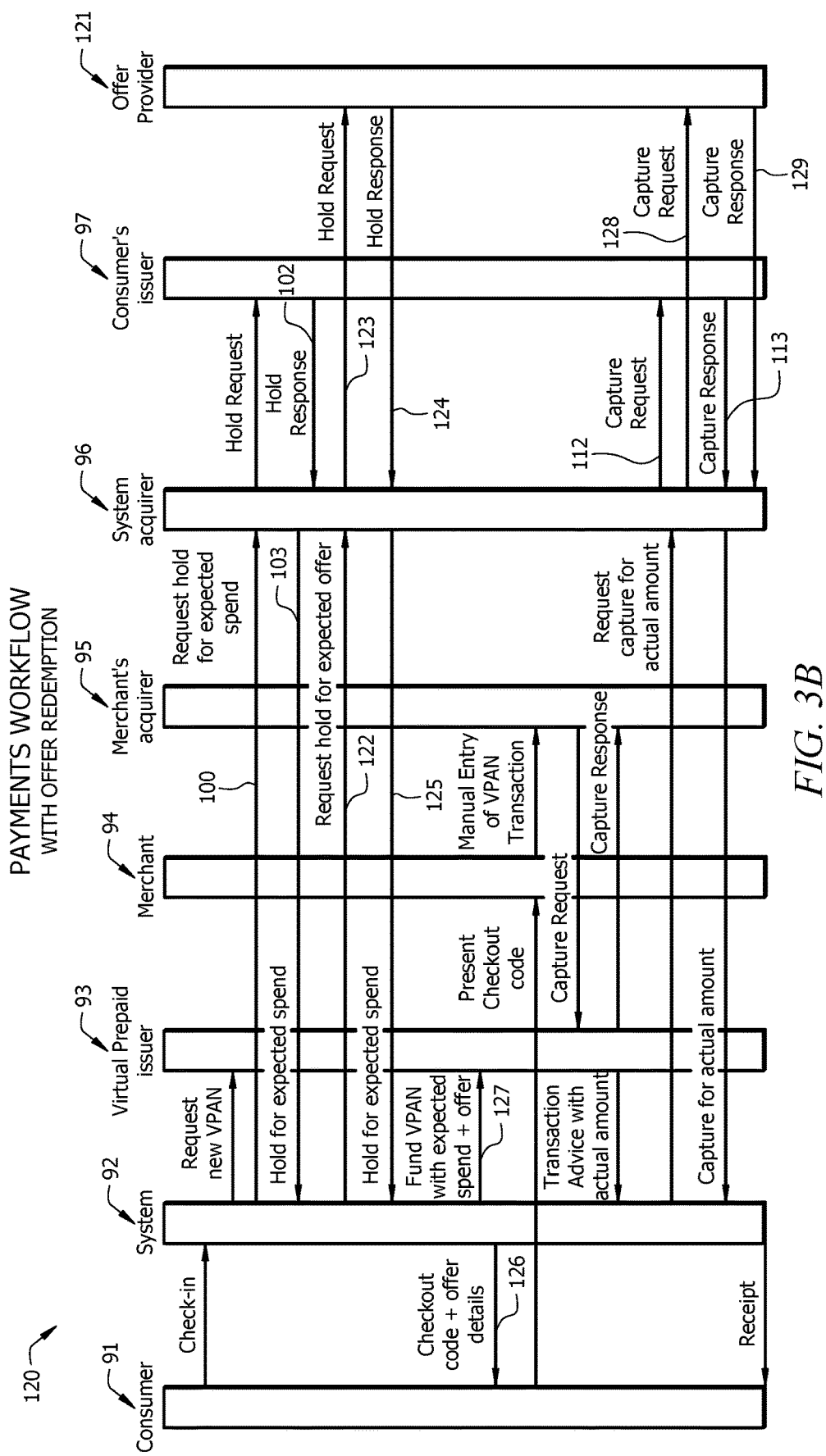

FIGS. 3A and 3B show embodiments of the payment workflow—FIG. 3A does not have an offer redemption but FIG. 3B does. As shown, FIG. 3B requires some extra steps such as 122 (hold for expected offer) and 126 (checkout code+offer details). Both embodiments complete with a capture and then presentation of the receipt.

Referring now to FIG. 3A, an embodiment of a payment workflow for a system according to the concepts described herein is shown. The embodiment of the workflow 90 shown in FIG. 3A does not include an offer to the consumer. Workflow 90 shows the process and message flow between the different entities utilized by the system. These entities include the consumer 91, the system 92, the virtual prepaid account issuer 93, the merchant, the merchant's acquirer 95, the system's acquirer 96, and the consumer's issuer 97. The merchant's acquirer and the system's acquirer are the institutions used by those entities to process electronic payments. The consumer's issuer is the payment mechanism used by the consumer to fund transactions, such as the consumer's credit card, debit card, bank account, PayPal account or any other payment system that could be used by the consumer to fund their purchases. Workflow 90 begins with the consumer 91 sending a check in notice 98 to system 92. Once the consumer 91 has checked in, system 92 sends a request 99 for a new VPAN to virtual prepaid account issuer 93. In addition, system 92 sends a hold request 100 for the consumer's expected or predicted spend to its acquirer 96, and acquirer 96 passes that hold request 101 to the consumer's issuer 97. Hold responses 102 and 103 are sent to system acquirer 96 and system 92, respectively, confirming the hold. Once the hold is in place on the consumer's issuer account, system 92 then funds 104 the VPAN at issuer 93 with the expected or predicted spend amount, and the checkout code 105 is sent to the consumer 91. At check out, consumer 91 presents the checkout code 106 to the merchant 94, and merchant 94 combines the merchant code (the prefix, as described with reference to FIGS. 12A-12C) with the consumer's checkout code (the suffix) to create the VPAN to be used in the transaction. The merchant then enters the VPAN as the payment mechanism for the transaction 107 which is sent to the merchant's acquirer 95. The merchant's acquirer 95 sends a capture request 108 to the virtual prepaid account issuer 93 which sends back a capture response 109 and sends a transaction advice 110 with the actual transaction amount to the system 92. To complete the transaction, the system 92 sends a capture request 111 to the system acquirer 96 for the actual amount to the transaction and the system acquirer sends a capture request 112 to the consumer issuer 97. A capture response 113 is sent by the consumer issuer 97 to the system acquirer 96, which is passed along 114 to system 92. System 92 can then issue an electronic receipt 115 to the consumer 91 to complete the transaction.

Referring now to FIG. 3B, another embodiment of a payment workflow 120 for a system according to the concepts described herein is shown. The embodiment of the workflow 120 shown in FIG. 3B does include an offer to the consumer. The entities are the same as were described with respect to FIG. 3A, except that an offer provider 121 is added to the transaction. As has been described, the offer provider may be any third party or may be the merchant 94 or even the system 92. In some embodiments, a gift provider may be used in place of or in addition to the offer provider 121. Functionality of providing a gift is substantially similar to the functionality of providing an offer. Workflow proceeds as described with respect to FIG. 3A, except that after the hold request 100 from system 92 and the hold responses 102 and 103, system 92 issues an additional hold request 122 and 123 to the offer provider 121 for the amount of the offer. The offer provider 121 then provides the hold responses 124 and 125 for the amount of the offer. If a gift provider is present an additional hold request may be issued to the gift provider with corresponding hold request from the gift provider. Once the original spend hold and the offer hold are in place, system 92 issues the checkout code 126 with the offer details and funds the VPAN 127 with the expected spend plus the offer. The rest of the workflow is again the same as the non-offer workflow except that an additional capture request 128 to the offer provider 121, with the capture request 112 to the consumer's issuer 97, is sent by the system acquirer 96. The offer provider 121 then sends the capture response 129 for the offer amount alongside the capture response 113 from the consumer's issuer. If a gift provider is present, the offer provider steps may be repeated for the gift provider.

FIG. 4 displays a possible flow chart diagram of a possible embodiment under the current disclosure. At step 1, a consumer can download an app from an app store or from a retailer, and register a payment card. At 1a, a process can begin of targeting coupons for the user based on analytics. At 2, the consumer can receive a coupon from Company A for $2 off Product A. At 3, the consumer can purchase Product A with the coupon, using either an app to pay, or the registered payment card. At 4, the consumer validates the coupon by either taking a photo of the receipt and sending or uploading the receipt to a server (or transmitting the receipt by some other means), or by EBT transaction. At 5, the consumer redeems the coupon by either getting a credit back to the payment card, or an immediate discount. The consumer can make his choice by selecting an option on the app screen. Other options may be available in other embodiments. At 6, the data regarding the consumer's purchase and coupon use can be collected and analytics can be performed on the data. The preceding steps can be repeated for different purchases by the same consumer, and for purchases by other consumers. The aggregated data can give a retailer, app provider, information broker, or other party, valuable data about the results of different marketing efforts. In embodiments such as shown in FIG. 4, an EBT system can be used to collect data, or other means can be used. Paying with an app can cause data to be automatically collected as the user receives a coupon, selects an item to buy, and pays for that item via the mobile app. However, using an EBT system can allow for data collection on purchases that typically aren't amenable to robust data collection.

FIG. 5 is a block diagram of a possible embodiment of a merchant-consumer interaction 1100. User device 1105 may interact with a detection device 1110 upon entering a service area of a merchant. In some embodiments, the user device 1105 may be actively searching for detection device 1110, while in other embodiments, the detection device 1110 may be actively searching for user device 1105. While only one user device 1105 and detection device 1110 are depicted, it should be understood that any number of user devices 1105 and any number of detection devices 1110 may be present in the service area of the merchant. Detection device 1110 may be capable of detecting the presence of user device 1105 using various technologies, some examples of the detection technologies include WiFi, Bluetooth, NFC, geofencing, or any combination of these technologies or any other technology that may be used to detect the presence of user device 1105. Upon detecting user device 1105, detection device 1110 may inform backend 1115 of the presence of the device at the service area of the merchant. Backend 1115 may determine whether or not the user device 1105 is registered with the payment/offer service. If user device 1105 is registered with the payment/offer service, backend 1115 delivers a push notice to user device 1105. Responsive to push notice 1120, app popup 1130 may be displayed on user device 1105 to a user. App popup 1130 may display offers for the merchant or other information relevant to transactions with the merchant. Backend 1115 may determine the forms of payment accepted by the merchant and generate an appropriate VPAN or other payment code for use during transactions between the consumer and merchant. Backend 1115 may make this determination based upon a previous agreement with the merchant, or based upon devices installed in the merchant service area. If the user device 1105 and the merchant support Bluetooth, then Bluetooth checkout module 1135 may be used to detect the user device 1105 based upon a Bluetooth MAC address of the user device 1105. Subsequently, the user device 1105 may be used to transmit payment information via Bluetooth MAC 1165 to checkout device 1185, which in turn may provide payment information, for example a VPAN, to POS 1190. In some embodiments, a Bluetooth transmitter in the checkout device 1185 may be attenuated in order to reduce the transmission area of the Bluetooth signal. In some embodiments, detection device 1110 and checkout device 1185 may be housed in a single apparatus, in others, they may be housed in separate apparatuses. If the user device 1105 and/or the merchant do not support or choose not to use Bluetooth checkout 1135, then backend 1115 provides an encoded VPAN 1150 to app 1160. App 1160 presents the encoded VPAN 1150, or some other payment code, to the checkout device 1185 via one of NFC NDEF 1175, barcode 1175, or SMS 1180. Checkout device 1185 may contain one or more of a NFC communication device, a barcode reader, and an input device for entering a payment number. The payment number may be a VPAN, an encoded VPAN 1150 or some other payment code that may be correlated by the checkout device 1185 via the backend 1115 to a VPAN. Checkout device 1185 may also contain a module to decode and/or verify an encoded VPAN 1150. This may be accomplished using a hash function or other techniques used for encryption/decryption.

The merchant's existing POS, credit card, debit card, EBT, loyalty points, or other payment equipment and networks may be able to process the VPAN or payment indicator similarly to the processing of more traditional credit card, EBT, loyalty payments and the like. The system interacts with, secures, and accounts for all of the related payment transactions between the VPAN, the consumer's form of funding, the offer or gift forms of funding, and the merchant's agreed forms of payments via the coin. In some cases, the payment workflows of e.g. FIGS. 3A-3B, may perform a portion of the consumer-merchant interaction of FIG. 5. In these cases, the checkout code described in FIGS. 12A-12C may be a partial VPAN, the complete VPAN, an encoded VPAN, a coin, a portion of a coin, or some other indicator that may be associated with the coin and/or VPAN by the backend.

Figure 6:
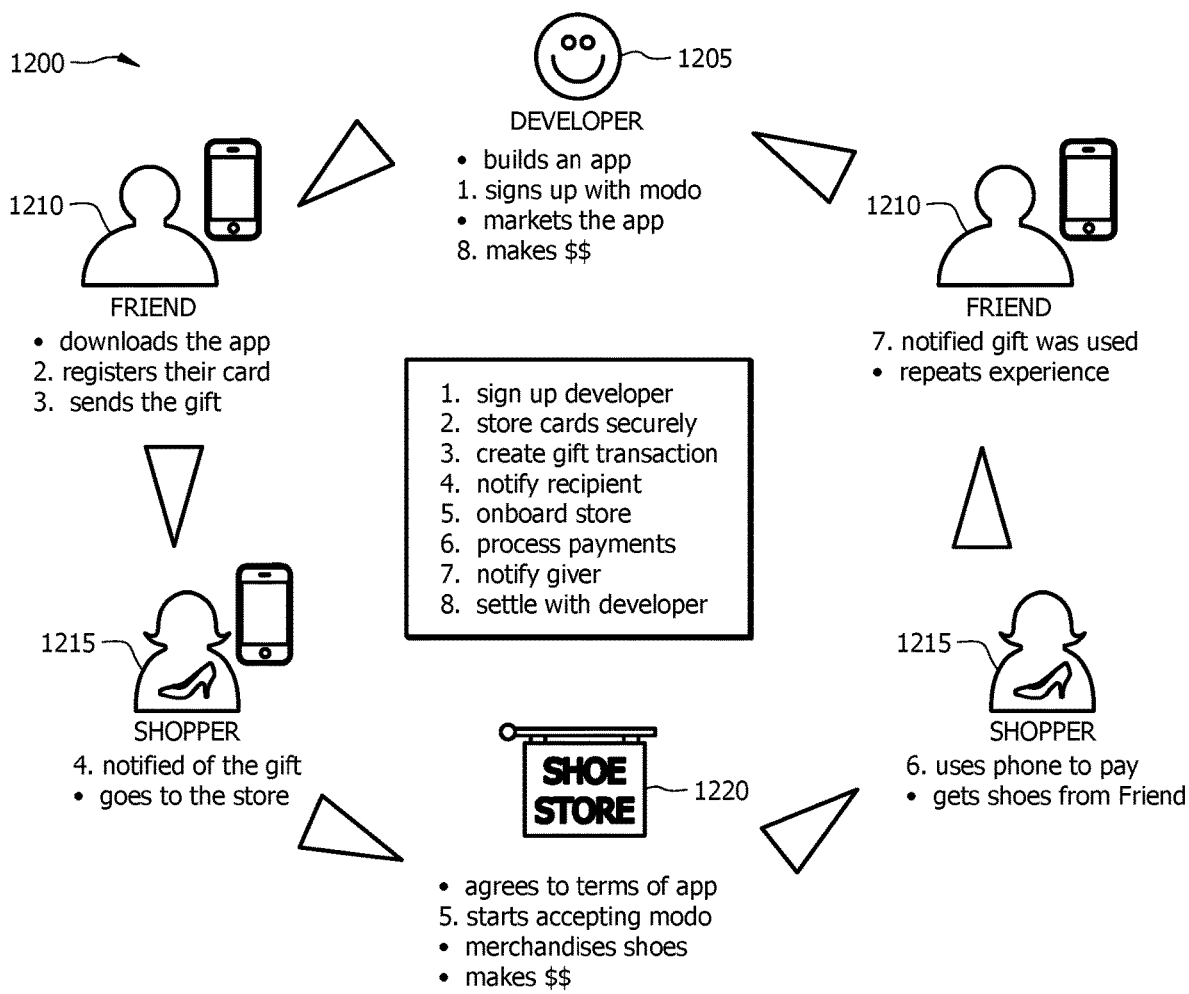
FIG. 6 is a flow-chart diagram of a possible embodiment under the present disclosure.
Figure 7:
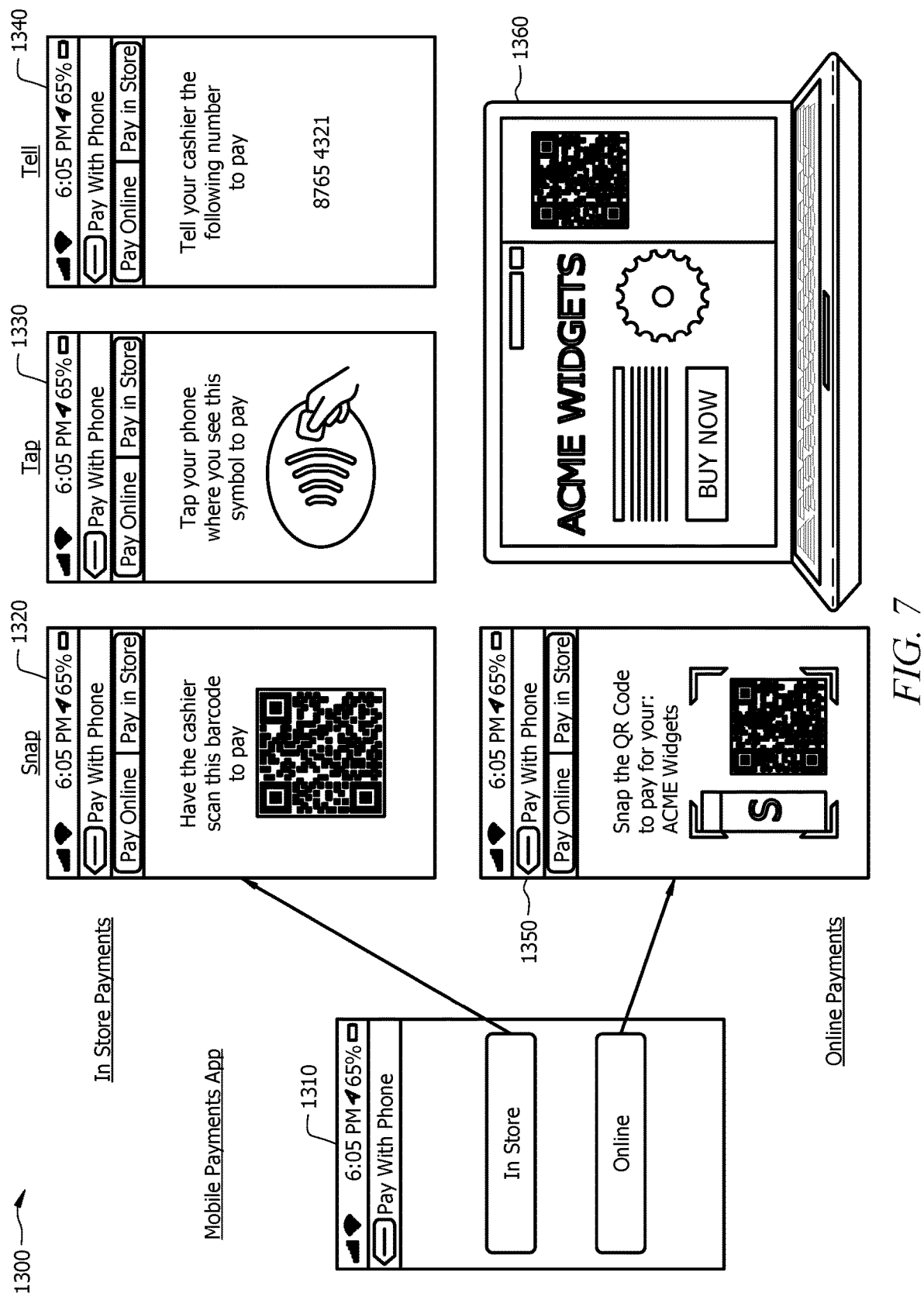
FIG. 7 is a flow-chart diagram of a possible embodiment under the present disclosure.

FIG. 6 shows an embodiment by which an app developer can take advantage of the present teachings, including by allowing users to buy gifts for other users. Each user in the chain must accept the terms of the transaction, but each party can gain benefit from the system. App developers and merchants can gain customers, and customers can gain easy and beneficial shopping opportunities and hopefully lower prices as developers and merchants compete for their business. The present teachings can also be utilized in any of online shopping, in store shopping, or mobile shopping, as shown in FIG. 7. App developers can include retailers, marketers, EBT providers, or other parties.

FIG. 6 is a diagram of a possible embodiment of a gift giving and usage sequence 1200. Developer 1205 may develop an app related to certain merchants or payment services. Developer 1205 may register the app with a system for managing merchant-consumer interactions. A user, Friend 1210, may download the app and register a payment card or some other method of payment with the app and send a gift with a certain value to another user, shopper 1215. As an example, the gift may be a dollar value to spend at a merchant 1220 or may be for a specific item available from merchant 1220. Merchant 1220 may need to agree to terms and conditions of use of the app prior to accepting payment via the app. Shopper 1215 may visit merchant 1220 and make a purchase using the app. Friend 1210 may then be notified via the app or some other form of messaging that shopper 1215 has redeemed the gift.

FIG. 7 is a diagram of several possible embodiments of app screenshots used for payments 1300, via mobile or computer. Login screen 1310 is from an app that may be used to access the payment system. A user may select from login screen 1310 whether payment is to be made in a store or online. If an online payment is desired, pay online screen 1350 may be displayed. The user may have been shopping online at a merchant that utilizes the payment system. The merchant may display a bar code or other indicator to allow payment of the online purchase via the app as shown in online shopping screen 1360. The app may allow the user to scan or otherwise enter the bar code or other indicator into the app. The app may then transmit information to the payment system which may then communicate with the online merchant for payment. If an in-store payment is desired the user may select that option from login screen 1310. Depending on the capabilities of the merchant, several methods may be used for payment. Snap payment screen 1320 may be used by a merchant equipped with a barcode reader. Tag payment screen 1330 may be used by a merchant equipped with a NFC device, attenuated Bluetooth, Bluetooth LE, or other wireless payment communication device. The user may swipe or tap their mobile device on the NFC device, or other wireless payment communication device in order to facilitate payment to the merchant. Tell payment screen 1340 may be used at merchants that don't have the wireless payment equipment or a bar code reader, or if snap payment screen 1320 or tag payment screen 1330 are not working with merchant's equipment. Tell payment screen 1340 may display a payment code that the user will provide to the merchant for entry into a POS or other payment system.

Figure 8:
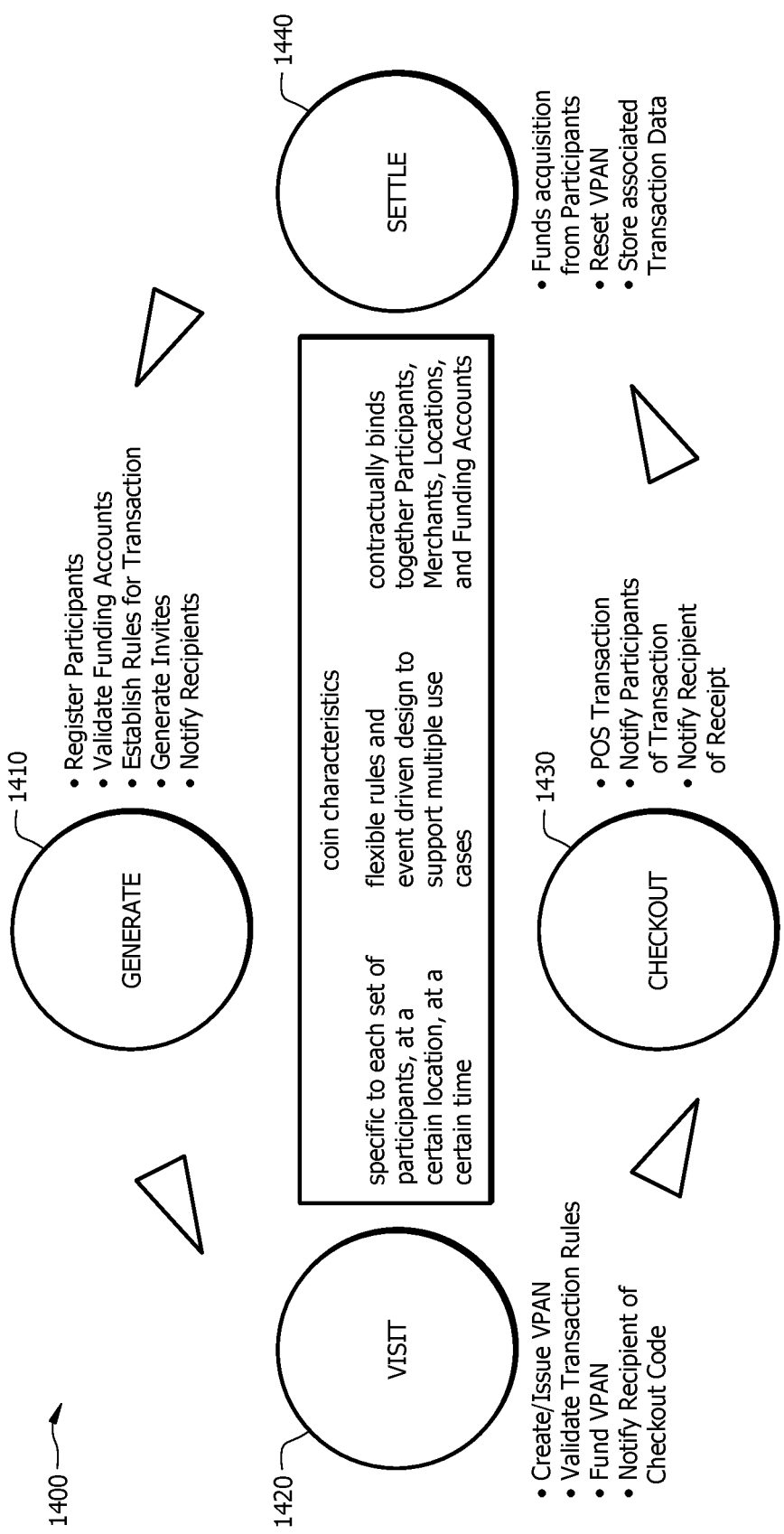
FIG. 8 is a flow-chart diagram of a possible embodiment under the present disclosure.

Some embodiments under the present disclosure can comprise transaction identifiers called coins. FIG. 8 is a diagram of the coin characteristics. As used herein, a coin is a unique or nearly unique identifier that is used to associate together a series of operations into a complete transaction. The coin may be specific to a set of participants using a payment system associated with the coin. The coin may also be specific to a certain time and/or location, for example the coin may only be valid for the 30 minutes after a user enters a store. The coin may be flexible based upon rules and event driven designs that may be configured to support multiple use cases. Further the coin may contractually bind together one or more of participants, merchants, locations, and funding accounts. At step 1410, a coin may be generated. Coin generation may include one or more of the following:

registering participants that may use the coin, validating funding accounts that may be used to fund the coin, establishing rules for a transaction associated with the coin, generating invites for usage of the coin, and notifying recipients of the coin. At step 1420, a coin user may visit a merchant. When a coin user visits a merchant that supports payment via coin, a VPAN may be created and issued for use with the coin; transaction rules of the merchant and payee may be validated; the VPAN may be funded from the previously associated funding accounts; and the user may be presented with a checkout code. At step 1430 a user checks out using coin or a VPAN associated with the coin for payment. The checkout may be conducted as a typical POS or EBT transaction. Depending on the devices available at the merchant, the VPAN associated with the coin may be transmitted wirelessly, scanned by a bar code reader, or verbally given to a cashier or other salesperson at the POS. Participants in the transaction may be notified via message of the transaction, and the recipient may be notified of receipt of payment. At step 1440, the coin transaction is settled. As part of settlement, funds may be acquired from the participants in the transaction, such as EBT providers or participators, credit card companies, and others. The VPAN associated with the coin may be reset, and transaction data associated with the transaction may be stored.

Figure 9:
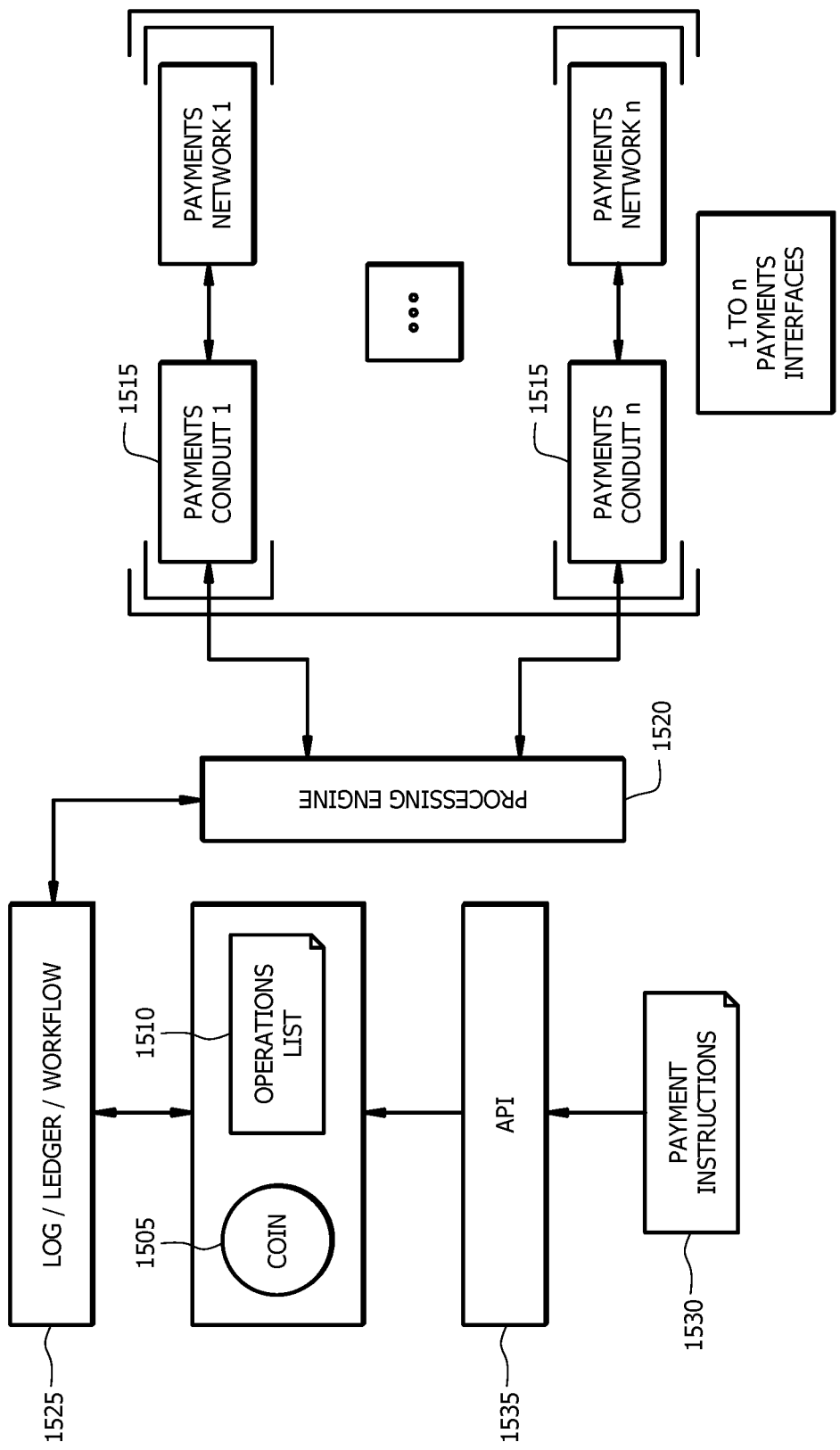
FIG. 9 is a flow-chart diagram of a possible embodiment under the present disclosure.

FIG. 9 is a block diagram of one possible embodiment of coin based payment operations 1500. When a payment request or payment instruction 1530 is received, a coin 1505 may be created. Payment instructions 1530 may be received at an application programming interface (API) 1535. An operations list 1510 may be associated with coin 1505. API 1535 may interact with coin 1505 and operations list 1510. Operations list 1510 may comprise one or more payment operations that are required in order to complete the payment instructions 1530. Each payment operation is associated with a payment conduit 1515. There may be 1 to n payment operations each corresponding to a payment conduit 1515. For example, a first payment conduit may be related to a consumer requesting funds from the consumer's issuer. A second payment conduit may be related to an offer from an offer provider. A third payment conduit may be related to a gift provided from a third party to the consumer via a gift card provider. A fourth payment conduit may be related to the merchant's acquirer for receiving payment. Log/ledger/workflow 1525 tracks the completion of payment operations in the operations list 1510. Processing engine 1520 may monitor or cause payment operations to execute. At the completion of all the payment operations in the operations list 1510, the coin will be balanced from an accounting standpoint.

Another embodiment can proceed as follows. A customer visits a retail store of Brand X. Wireless sensors located at the store detect the presence of the customer's mobile device, which has been set to allow push notifications from Brand X. As Brand X's servers realize that the customer is located in the store a notification can be sent to the payment processing company. The payment processing company creates a VPAN for the customer to use when checking out of the store. Brand X can send a coupon, such as 15% off of shirts, to the customer's mobile device. The customer can click on the offer. The customer can shop as normal, choosing various products, and in this case, several shirts. In preparing to check out, the customer can select the money source to use to fund the VPAN one time digital payment card. In this example, the customer chooses to use loyalty points, while the POS device is a customer tracking embodiment (similar to EBT). The customer, at checkout, provides the cashier with mobile device so that it can be scanned. The visual code provided, either a digit string or a visual code such as a QR code or bar code, provides the VPAN for payment as well as any offers/coupons, such as the 15% off coupon of this example. Using the EBT system, an image or copy of the receipt is sent to the retailer so the retailer can study the customer's buying habits. One receipt may not be very valuable, but multiple receipts over time, and multiple receipts across multiple customers will be very valuable in the aggregate.

Figure 10:
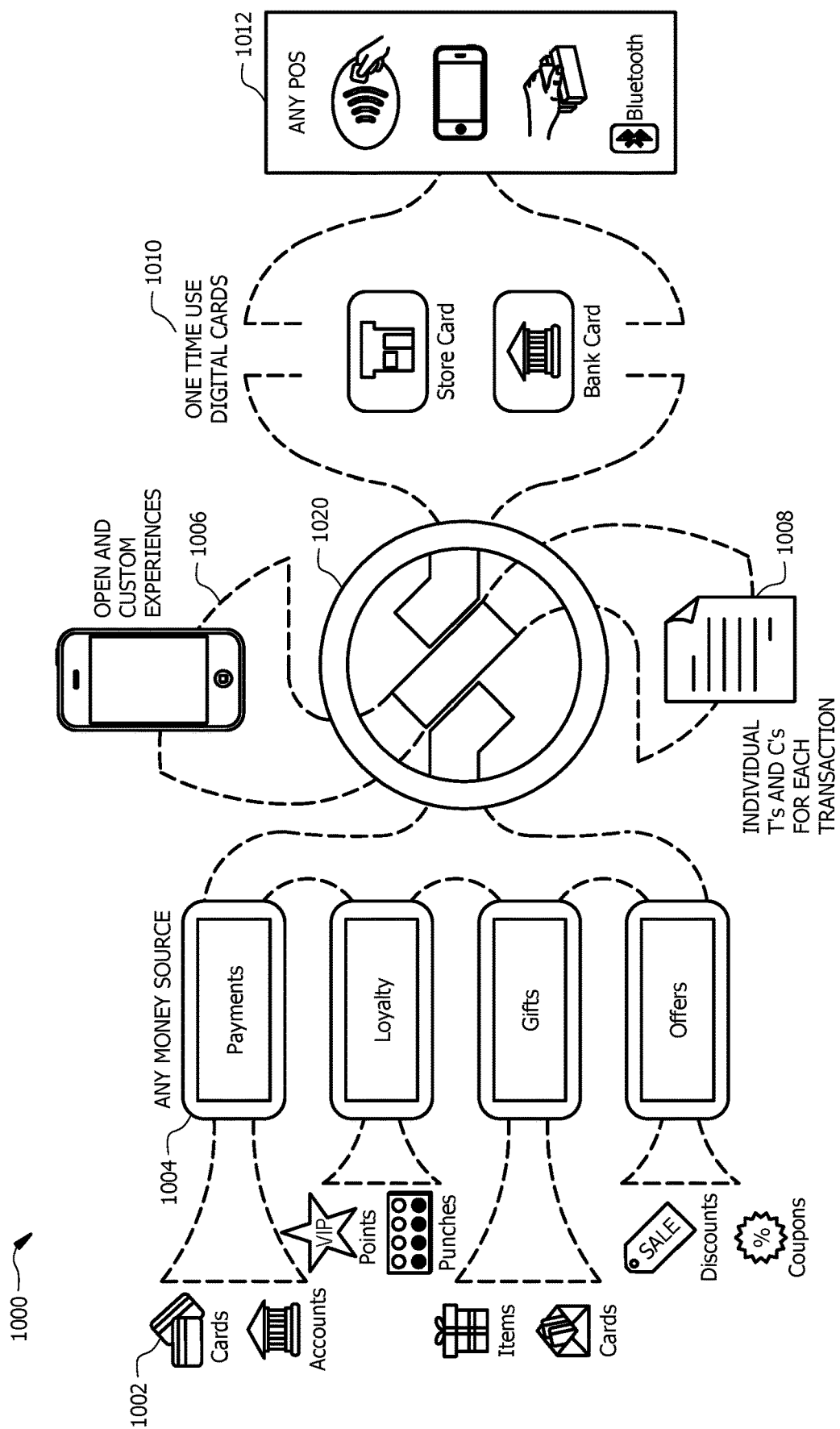
FIG. 10 is a diagram of a possible embodiment under the present disclosure.
Figure 11:
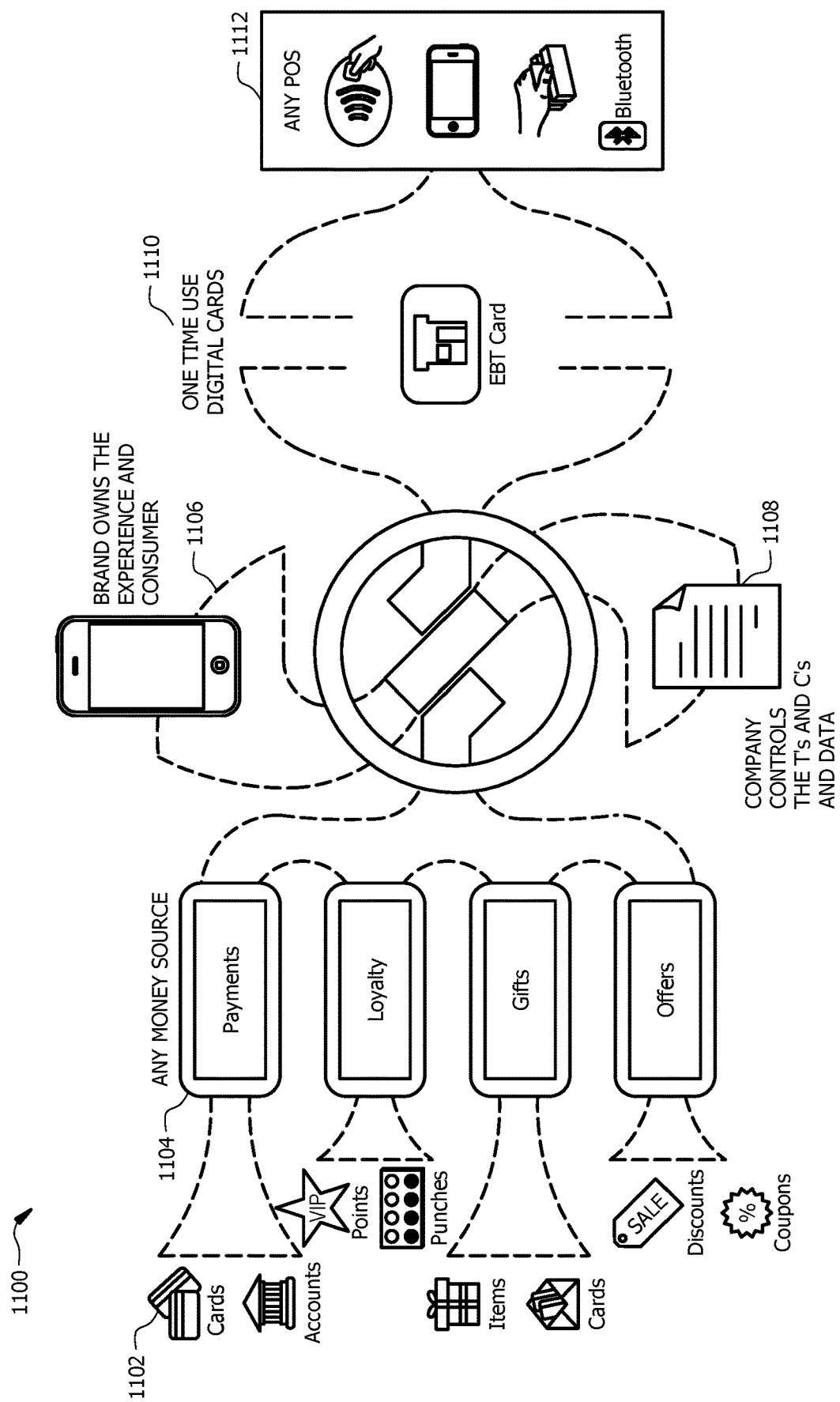
FIG. 11 is a diagram of a possible embodiment under the present disclosure.

FIG. 10 shows another possible embodiment of a VPAN payment system under the present disclosure. System 1000 allows customers to choose from a variety of funding sources 1004 (drawing from specific funding sources such as sources 1002) and to complete the payment in a format desired or allowed by a retailer. To allow the consumer to use a payment method of choice, a VPAN is created that matches the retailer's accepted payment. The format of the VPAN can take a variety of forms, the preferred embodiment will be a 16 digit number, similar to credit cards (seen below in FIGS. 12A-12C). Various other length or formats can be used. A VPAN for a customer to use will preferably be made substantially prior to the customer entering a given store. When a customer downloads and installs an application, and possibly selects merchants, a group of VPANs may be created that are meant to be used in the future. Alternatively, a user's mobile device may be programmed to recognize (or be recognized) by sensors at a merchant's location. Options for this functionality could be Wi-Fi or Bluetooth, or other sensors. When a customer enters a store, the sensors may recognize the customer, report the customer's location to a remote server or monitoring station, and a VPAN may be created for the customer to use if a purchase is made. As described, the VPAN payment system can resemble a one-time use digital card 1010. The system can fuse together multiple money sources 1002, 1004 into a one-time use digital card for every purchase. The transaction can be carried out at a point of sale (POS) location 1012. POS 1012 can comprise a Bluetooth module connected to via a smartphone, another wireless connection, or other means of communication. A mobile application, computer, software program, or other device 1020 can direct a consumer's interaction with POS 1012 and any backend servers or software. A retailer or other service provider may create an open or custom user experience 1006 for the user. Application 1020 can deal with multiple retailers, marketers, and other parties. Terms and conditions 1008, or other contractual matters, can differ from transaction to transaction. In other embodiments, an application may be created with terms and conditions that cover all transactions carried out, regardless of retailer. FIG. 11 shows another possible embodiment similar to FIG. 10, except that the system 1100 is more focused on a system comprising EBT technology. As discussed above, EBT systems can comprise mechanisms for approving, recording and analyzing purchases.

Figure 12A:
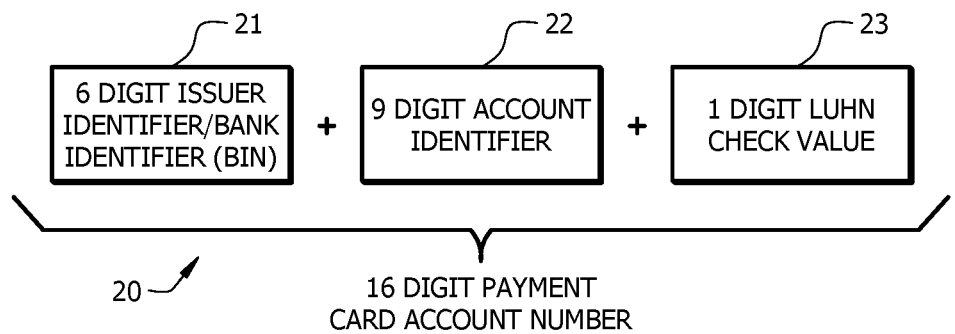
FIGS. 12A-12C are diagrams of possible embodiments of virtual payment account numbers under the present disclosure.
Figure 12B:
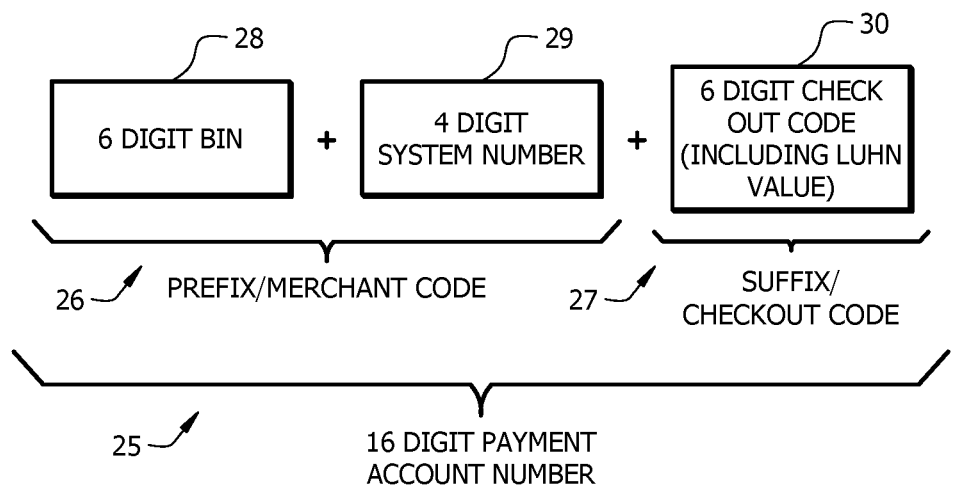
Figure 12C:
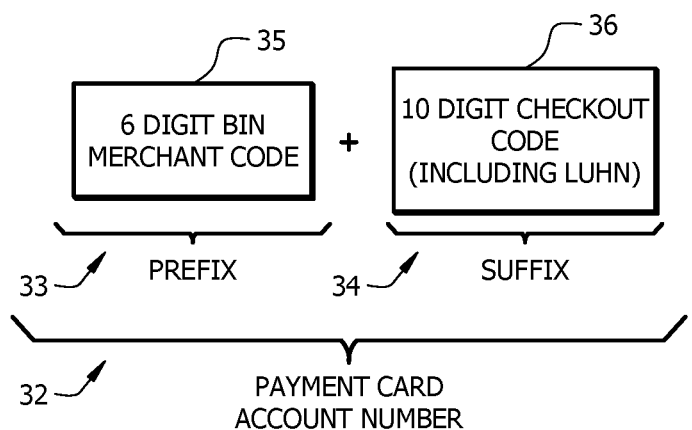

Referring now to FIGS. 12A-12C, embodiments of the construction of a VPAN usable with the present system and service is described in greater detail. FIG. 12A shows a typical payment card account number used by the Visa/Mastercard processing systems. In a preferred embodiment, an account number 20 is 16 digits long and is formed by a leading six digit issuer identifier (BIN) 21 that identifies the bank or financial institution that issued the card. While a 16 digit number is shown, any number of digits can be used to create a VPAN according to the concepts described herein. The BIN 21 is followed by a nine digit account number 22 for the particular consumer/card and a one digit LUHN check value 23 that allows the processor to verify that the account number is valid.

FIG. 12B shows one embodiment of a VPAN according to the concepts described herein. The VPAN in this embodiment is a sixteen digit account number 25 processable by existing payment card payment processing systems found at most merchants. The VPAN is formed from two parts. The first portion, or prefix 26, is the merchant code and can be 10 digits formed from the six digit BIN 28 and a four digit system number 29 assigned by the present system. The second portion, or suffix 27, is the checkout code and is formed by a five digit number plus a LUHN check value 30. During a transaction, such as in e.g. FIGS. 1, 2, and 3A-3B, the prefix and suffix can be combined at the time of a transaction to form a payment card account number usable by the merchant to process the transaction.

FIG. 12C shows an alternate embodiment of a VPAN according to the concepts described herein. VPAN 32 is formed by a six digit prefix 33 consisting of the BIN 35 and a 10 suffix 34 that is the consumer token also referred to as the checkout code and LUHN value 36. While FIGS. 12B and 12C show two embodiments of a VPAN, one skilled in the art will understand that there are any number of ways to form a VPAN where a portion of the VPAN is given to the merchant and the remainder of the VPAN is given to the consumer, where the VPAN is formed by combining the merchant portion with the consumer portion in some manner. Further, the VPAN may represent a stored value account that is particular to this merchant or is in some other fashion unique. Other divisions of the prefix and suffix may also be used in order to optimize processing to specific card ranges including dividing payment card account numbers into more than two constituent parts. This includes handling different card number sizes such as for 13-digit VISA® cards, 15-digit American Express® Cards and Diner's Club® Cards, EBT card numbers, and any size of other commonly used or proprietary card numbers.

In embodiments where the customer's presence is detected at a retail location, the merchant (or other third party) may be able to send the customer a notification of products on sale, coupons, offers or other communications. If a customer enters a clothing store for Brand Y, then Brand Y may send a 15% off coupon, for example. If a customer enters a grocery store, then a yogurt company may be able to send a coupon for yogurt in the hopes the customer will choose its product. Some embodiments may even be able to track a customer's location within a store and target advertisements or offers to a customer's location: near the produce, deli, pharmacy, etc. In the embodiments described above, the retailer, merchant, seller, or advertiser would like to have measurable evidence of how effective their advertisements or marketing efforts were. To provide such functionality, the system can be implemented to process the transaction using the EBT payment process and thereby capture a receipt of the entire transaction involving a VPAN and report it to the retailer/merchant/advertiser/etc. Such reporting will capture the customer's entire shopping cart and will have to be done with the permission of the customer. Permission can be obtained, for example when the customer installs a mobile application on their mobile device.

Various embodiments of the EBT system can be combined with VPAN functionality. For example, when a customer checks in at a retailer (either automatically or manually), the system can send a request to the system acquirer for a hold on funds for an expected spend amount. The system acquirer sends a hold request to the customer's issuer. A response is sent from the issuer to the acquirer and then to the system. The virtual prepaid issuer then funds the VPAN, and a checkout code is provided to the customer. The customer presents the checkout code to the retailer, and VPAN information is sent to the retailer's acquirer. A capture request is sent from the retailer's acquirer to the prepaid issuer. A capture response is sent to the system acquirer and then to the consumer's issuer. A response goes from the consumer's issuer to the system acquirer and the capture is sent to the system.

Figure 13:
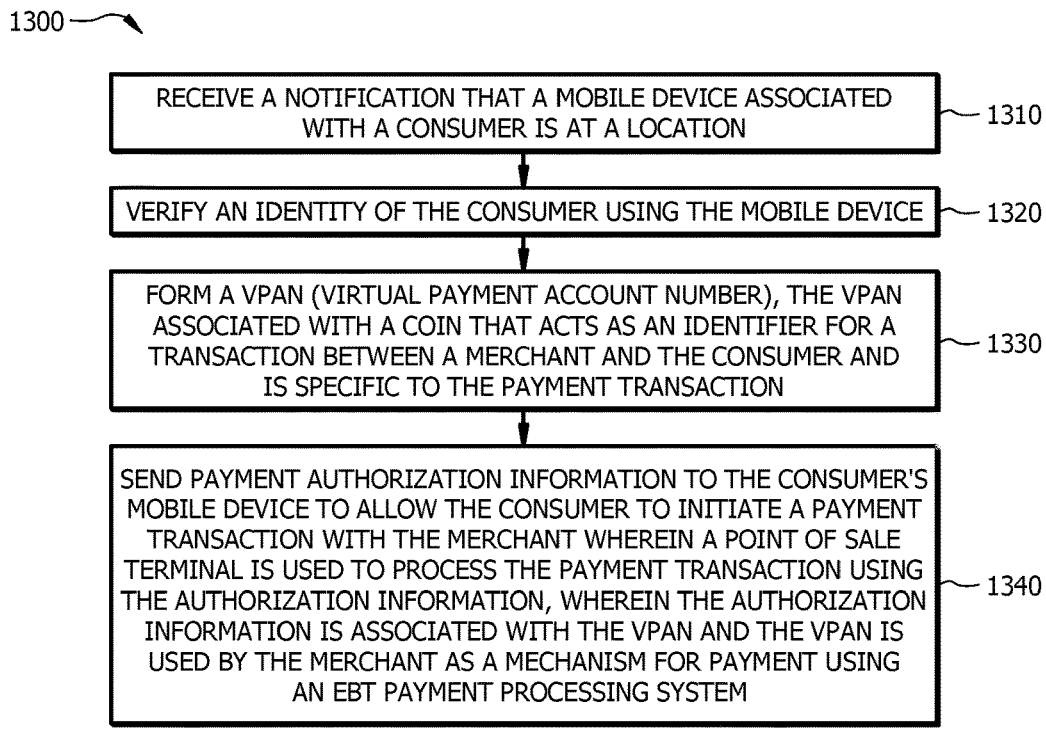
FIG. 13 is a flow-chart diagram of a possible embodiment under the present disclosure.

FIG. 13 displays a possible method embodiment 1300 under the present disclosure. At 1310, a notification is received that a mobile device associated with the consumer is at a location. At 1320, the identity of the consumer is confirmed by receiving data from the mobile device. At 1330, a VPAN (virtual payment account number) is formed, wherein the virtual payment account number is associated with a coin, the coin acting as an identifier for a transaction between the merchant and consumer and is specific to the payment transaction. At 1340, payment authorization information is sent to the consumer's mobile device to allow the consumer to initiate a payment transaction with the merchant, wherein a point of sale terminal is used to process the payment transaction using the authorization information at the request of the consumer, wherein the authorization information is associated with the virtual payment account number and the virtual payment account number is used by the merchant as a mechanism for payment using an EBT payment processing system.

Figure 14:
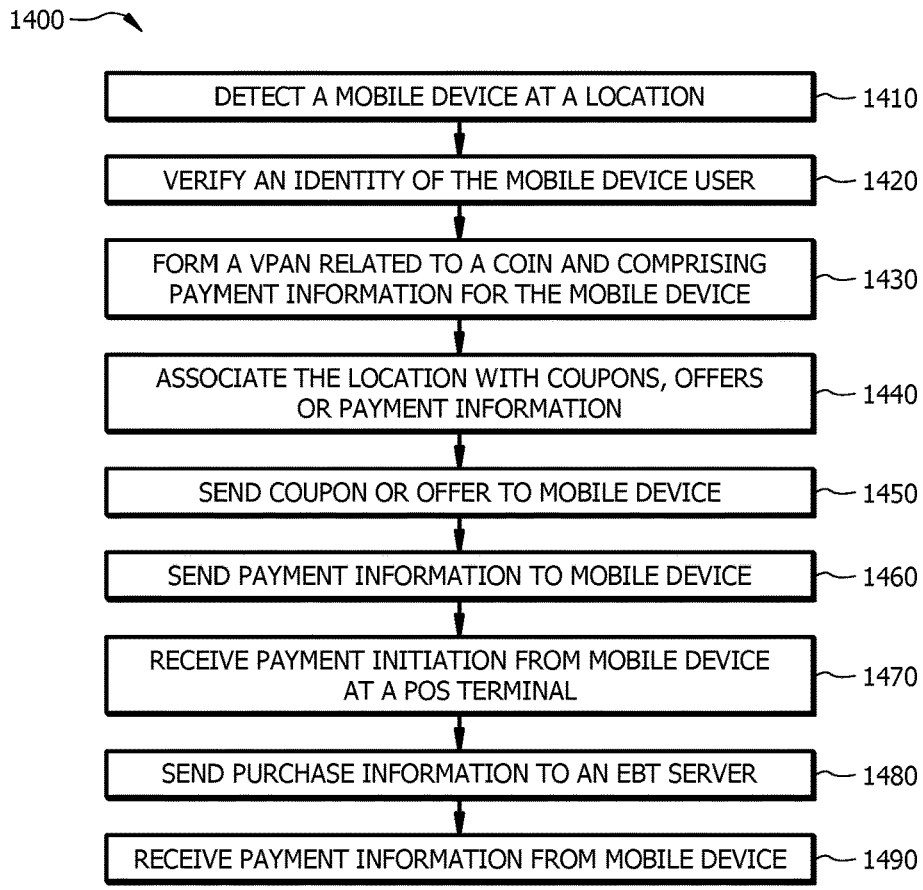
FIG. 14 is a flow-chart diagram of a possible embodiment under the present disclosure.

FIG. 14 displays another possible method embodiment 1400 under the present disclosure. At 1410, a mobile device is detected at a location. At 1420, the identity of the mobile device user is verified. At 1430, a VPAN is formed that is related to a coin and for payment information for the mobile device. At 1440, the location is associated with coupons, offers, or payment information. At 1450, the coupons or offers are sent to the mobile device. At 1460, at least a portion of payment information is sent to the mobile device. At 1470, payment initiation is received from the mobile device at a POS terminal. At 1480, purchase information is sent to an EBT server. In some embodiments, the EBT server may provide approval for the purchase. At 1490, payment information is received from the mobile device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for allowing a consumer to complete a payment transaction using a payment account of the consumer with a merchant at a merchant location, the system comprising:

a detection unit operable to detect a mobile device associated with the consumer;

one or more remote servers in communication with the detection unit, the remote servers used to verify an identity of the consumer using the mobile device and to form a virtual payment account number and a coin, wherein the virtual payment account number and the payment account of the consumer are associated with the coin, the coin acting as an identifier for a transaction between the merchant and consumer and is specific to the payment transaction, the remote servers further operable to send payment authorization information to the consumer's mobile device to allow the consumer to initiate the payment transaction with the merchant; and an EBT point of sale terminal used to process the payment transaction at the request of the consumer, processing the payment transaction using the payment authorization information, wherein the payment authorization information is associated with the virtual payment account number and the virtual payment account number is received by the EBT point of sale terminal from the one or more remote servers and used by the merchant as a mechanism for payment using an EBT payment processing system for the purpose of identifying each item purchased by the consumer, further wherein the identity of the items purchased by consumer is captured at the one or more remote servers and associated with the consumer using the coin; and wherein the payment account of the consumer is a non-EBT payment account.

2. The system of claim 1 wherein the EBT payment processing system saves one or more data points related to the payment transaction.

3. The system of claim 2 wherein the one or more data points comprises a list of items purchased.

4. The system of claim 1 wherein the remote server is configured to present the consumer an offer redeemable at the merchant.

5. The system of claim 1 wherein the remote server is configured to prefund the virtual payment account number with funds expected to be sufficient to cover the payment transaction.

6. The system of claim 1 wherein the virtual payment account number expires after a predetermined amount of time.

7. The system of claim 2 wherein the one or more data points comprises coupon information.

8. The system of claim 2 wherein the one or more data points comprises consumer information.

* * * * *